United States Patent [19]
Reinhard

[11] Patent Number: 5,207,404
[45] Date of Patent: * May 4, 1993

[54] DRIVE SCREW EYE OR HOOK

[76] Inventor: Timothy Reinhard, 5231 S. Ingleside, Chicago, Ill. 60615

[*] Notice: The portion of the term of this patent subsequent to Oct. 23, 2007 has been disclaimed.

[21] Appl. No.: 599,615

[22] Filed: Oct. 18, 1990

Related U.S. Application Data

[63] Continuation-in-part of Ser. No. 369,747, Jun. 22, 1989, Pat. No. 4,964,602.

[51] Int. Cl.⁵ .............................................. F16B 23/00
[52] U.S. Cl. .................................. 248/217.4; 248/497; 248/546; 411/402
[58] Field of Search .................... 248/217.4, 546, 497; 411/401, 400, 402, 403, 404, 410, 394, 398

[56] References Cited

U.S. PATENT DOCUMENTS

| | | | |
|---|---|---|---|
| 17,488 | 6/1857 | Coffin | 411/400 |
| 350,209 | 10/1886 | Parmelee | 248/217.4 X |
| 356,721 | 1/1887 | Leber et al. | 411/401 X |
| 2,764,197 | 9/1956 | Torresen | 411/404 |
| 2,885,169 | 5/1959 | Thiel | 248/546 X |
| 3,224,721 | 12/1965 | Malmquist | 248/217.4 X |
| 4,196,883 | 4/1980 | Einhorn et al. | 248/546 |
| 4,964,602 | 10/1990 | Reinhard | 248/217.4 |

Primary Examiner—Alvin C. Chin-Shue
Attorney, Agent, or Firm—Patula & Associates

[57] ABSTRACT

A support device or fastener comprised of a shank having a threaded end adapted to be driven into a member for securing the shank within the member and having a support end. A cavity or protrusion drive receiving configuration is configured to the support end of said shank in order to be rotated by a drive force element in order to drive the support device into a member or surface. The support device may be configured with a phillips, spline, multiple spline, torx, hex or square cavity or protrusion or by other conventional configurations which is configured on a ring, open hook, "L"-shaped or other configuration.

A support device comprising a shank having a threaded end and a circular configuration end adapted to be driven into a member for securing the shank therewithin. At least one torquing cavity is integral with the outside circumference of the circular configuration end of the shank, and aligned with the longitudinal axis which bisects the circular configuration end. The torquing cavity is configured to receive a torquing tool.

10 Claims, 3 Drawing Sheets

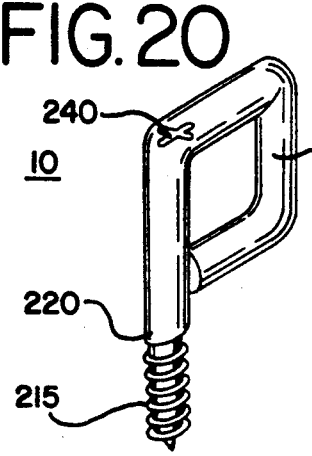
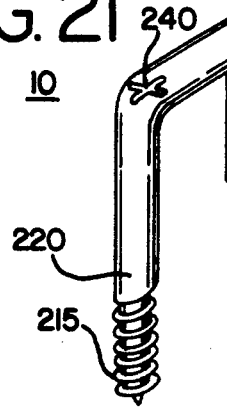
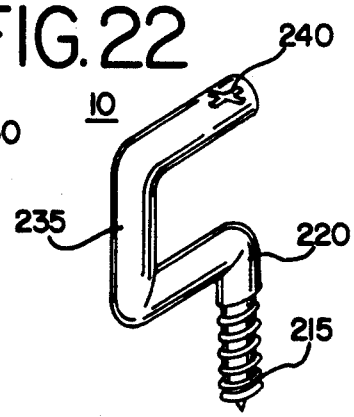
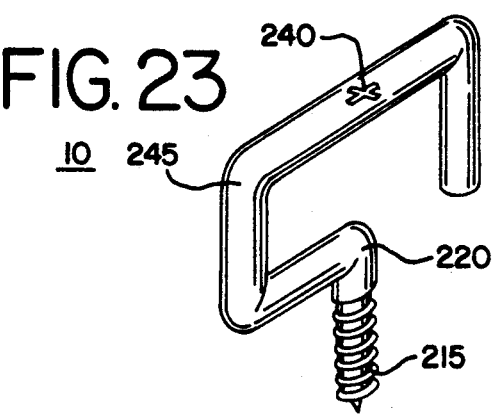
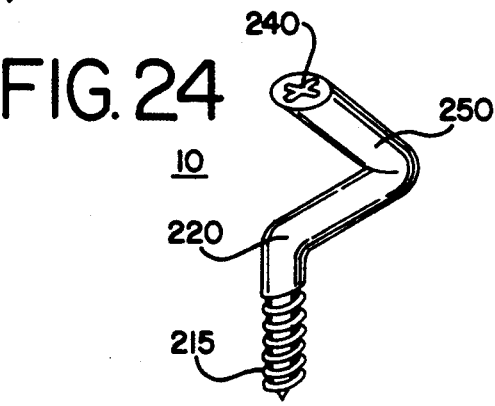
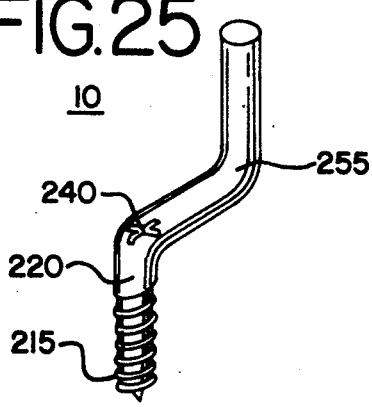
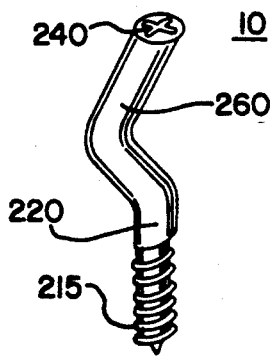
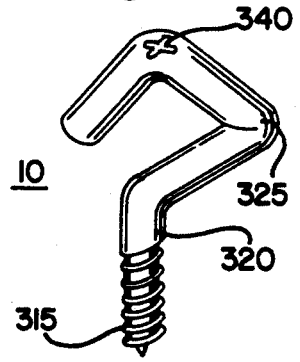
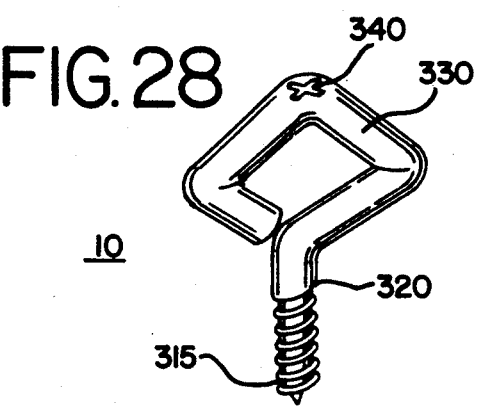
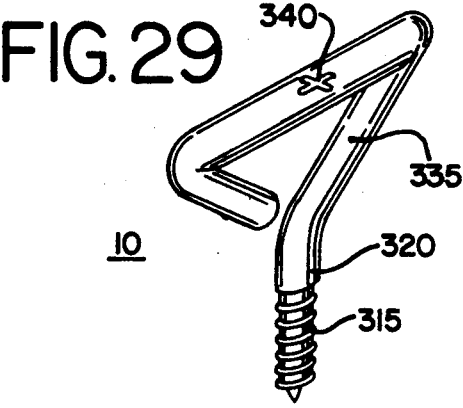

DRIVE SCREW EYE OR HOOK

This application is a continuation-in-part of parent application Ser. No. 369,747, filed Jun. 22, 1989, U.S. Pat. No. 4,964,602, issued Oct. 23, 1990. The present invention relates to a fastening apparatus in which a conventional drive formation is formed on the end of either a screw eye or hook. The drive formation on one end allows the installation of the eye or hook with an electric screwdriver or by hand at a high rate of speed and efficiency.

BACKGROUND OF INVENTION

Various screws and mounting devices have been known in the past and have been known as the footing for modern society to build, attach or fasten devices together, For example, shown in U.S. Pat. No. 1,365,508 to Kucewicz entitled "Screw" and issued on Jan. 11, 1921 is a fastener having a screw on one end which provides an improved means for supporting a hook hanger or the like on the other end. However, such devices are cumbersome to install or remove unlike the present invention.

The design patent to Einhorn, U.S. Pat. No. Des. 254,707 issued on Apr. 15, 1980 depicts the ornamental design for a hook with fastening device through a solid surface. Such a hook likewise has no easy method of installation.

Various screws, hooks or eyes are disclosed in U.S. Pat. No. 293,079 patented on Feb. 5, 1884 to Pope, each having various eye hooks which are either open or closed and other fastening devices, none of which could be readily installed or removed like the present invention.

The present invention is an improvement in the construction of a fastening device of the type being a hook or ring which by its screwshank, may be secured at any desired point. No known device discloses the present invention's drive receiving means on its end. No patent or device is known to disclose the present invention and its ability to adequately fasten or hold two components together and be readily installed or removed by a quick means. In the past, a screw eye or hook, open hook or L-shaped hook had to be inserted by hand, pliers or some other grabbing tool or by the cumbersome insertion of a tool within the fastening device and very inefficiently rotated into the surface or member.

Simarlarly, in the past, a T-shaped fastener, open or closed square hook, C-shaped hook, elongated rectangular hook, V-shaped hook, crank shaped hook, bent hook, open diamond hook, eye or closed diamond hook, eye or triangle hook, each of these fasteners had to be inserted by hand, pliers or some other grabbing tool or by the cumbersome insertion of a tool within the fastening device and very inefficiently rotated into the surface or member.

Applicant's invention provides advantages over previous fasteners in that it allows ring, hook or "L"-shaped fasteners to be driven and inserted by the use of either Phillips, Robertson, Allen or Hex or Torx type drivers as well as straight and others in order to accurately drive the desired fastener into the desired surface.

Likewise, Applicant's invention allows a "T"-shaped fastener, open or closed square hook, "C"-shaped hook, elongated rectangular hook, "V"-shaped hook, crank shaped hook, bent hook, open diamond hook, eye or closed diamond hook, eye or triangle hook to be driven and inserted by the use of either Phillips, Robertson, Allen or Hex or Torx type or polygonally shaped drivers as well as straight and others in order to accurately drive the desired fastener into the desired surface.

The fastener of the present invention has a further advantage of being operable in areas of close clearances.

Numerous other advantages and features of the invention will become readily apparent from the following detailed description other than the preferred embodiment of the invention, from the claims and from the accompanying drawings, in which like numerals are employed to designate like parts throughout the same.

BRIEF SUMMARY OF THE INVENTION

A fastening device such as screw eye, open hook or L-shaped hook has mounted at one end either a Phillips, Robertson, Allen or Hex or Torx or straight or polygon head drive formation fastened at the tip thereto and is dimensioned in such a way as when driven by the appropriate driving tool it rotates said fastener to mount or remove the same to or from the desired surface. A fastening device such as T-shaped fastener, open or closed square hook, C-shaped hook, elongated rectangular hook, V-shaped hook, crank shaped hook, bent hook, open diamond hook, eye or closed diamond hook, and eye or triangle hook has mounted at one end either a Phillips, Robertson, Allen, Hex, Torx, straight, or other polygonal shaped head drive formation, such as a torquing protrusion or a torquing protrusion housing a torquing cavity means, fastened at the tip thereto and is dimensioned in such a way as when driven by the appropriate driving tool it rotates said fastener to mount or remove the same to or from the desired surface.

BRIEF DESCRIPTION OF THE DRAWINGS

A fuller understanding of the foregoing may be had by reference to the accompanying drawings, wherein:

FIG. 20 is a perspective view of a closed square hook constructed in accordance with one of the alternative embodiments of the present invention;

FIG. 21 is a perspective view of an open square hook constructed in accordance with one of the alternative embodiments of the present invention;

FIG. 22 is a perspective view of a C-shaped hook constructed in accordance with one of the alternative embodiments of the present invention;

FIG. 23 is a perspective view of an elongated rectangular hook constructed in accordance with one of the alternative embodiments of the present invention;

FIG. 24 is a perspective view of a V-shaped hook constructed in accordance with one of the alternative embodiments of the present invention;

FIG. 25 is a perspective view of a crank shaped hook in accordance with one of the alternative embodiments of the present invention; and FIG. 26 is a perspective view of a bent hook in accordance with one of the alternative embodiments of the present invention.

FIG. 27 is a perspective view of an open diamond hook constructed in accordance with one of the alternative embodiments of the present invention;

FIG. 28 is a perspective view of an eye or closed diamond hook in accordance with one of the alternative embodiments of the present invention; and FIG. 29 is a perspective view of an eye or triangle hook in accordance with one of the alternative embodiments of the present invention.

DETAILED DESCRIPTION OF THE INVENTION

Figure 1:
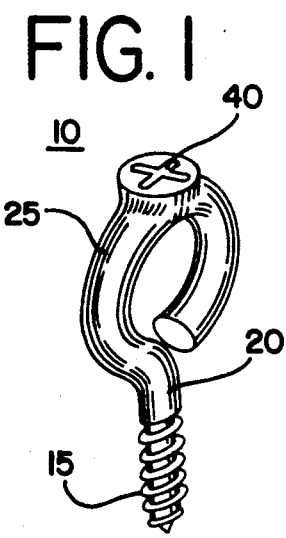
FIG. 1 is a perspective view of a screw eye constructed in accordance with one of the preferred embodiments of the present invention.

While the invention is susceptible of embodiment in many different forms, there is shown in the drawings and will herein be described in detail a number of preferred embodiments of the invention. It should be understood however, that the present disclosure is to be considered as only an exemplification of the principals of the invention and is not intended to limit the spirit and scope of the invention and/or claims to the embodiments illustrated.

Referring now to the FIGS., the numeral 10 indicates generally the fastening device of the present invention.

Figure 2:
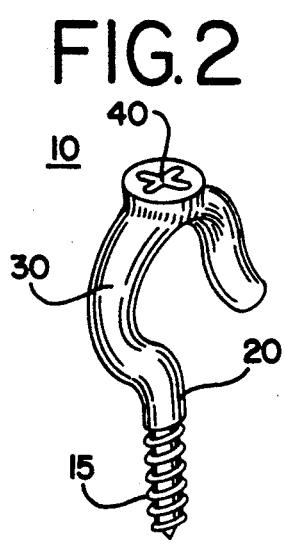
FIG. 2 is a perspective view of an open hook constructed in accordance with one of the preferred embodiments of the present invention.
Figure 3:
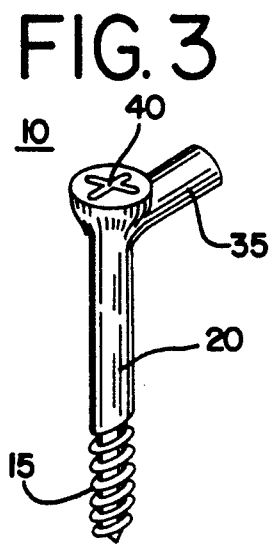
FIG. 3 is a perspective view of an L-shaped hook.
Figure 4:
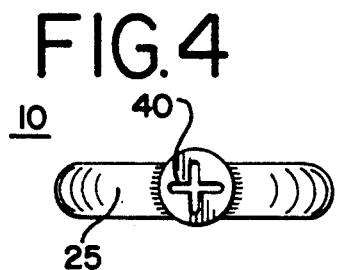
FIG. 4 is a top view of a Phillips head embodiment constructed in accordance with one of the preferred embodiments of the present invention.

Fastening device 10 as shown in FIGS. 1, 2 and 3 and have a threaded end 15 which is configured to be threaded into, upon rotation, a flat surface or member for securing shank portion 20 therewithin. Shank portion 20 is configured to a ring or screw eye portion 25 in FIGS. 1 and 7; an open hook portion 30 in FIG. 2; a "L"-shaped or leg shaped portion 35 in FIG. 3 configured upon eye portion 25 in FIGS. 1 and 4, open hook portion 30 in FIG. 2; and leg shaped portion 35 in FIG. 3, is a drive receiving means 40 which is configured as Phillips head or multiple spline configuration 40.

Figure 10:
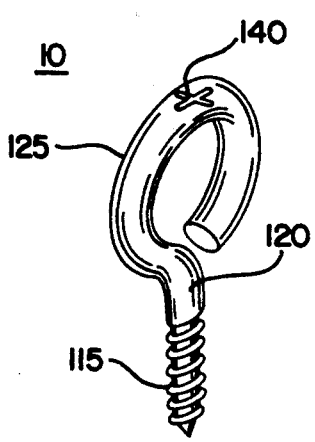
FIG. 10 is a perspective view of a screw eye constructed in accordance with one of the alternative embodiments of the present invention.
Figure 11:
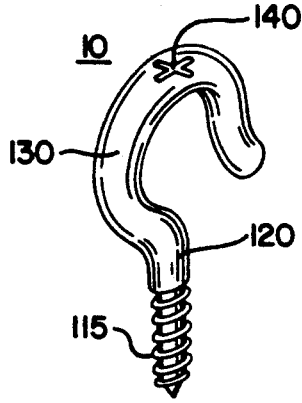
FIG. 11 is a perspective view of an open hook constructed in accordance with one of the alternative embodiments of the present invention.
Figure 12:
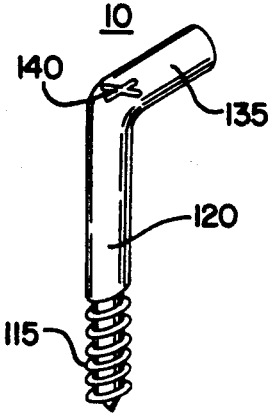
FIG. 12 is a perspective view of an L-shaped hook constructed in accordance with one of the alternative embodiments of the present invention.
Figure 13:
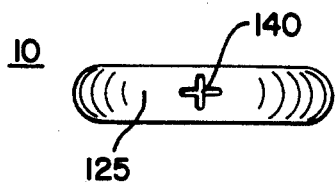
FIG. 13 is a top view of a Phillips or multiple spline head embodiment constructed in accordance with one of the alternative embodiments of the present invention.
Figure 17:
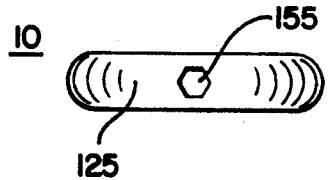
FIG. 17 is a top view of one of the fastening devices having a Allen or Hex head as one of the alternative embodiments of the present invention.
Figure 18:
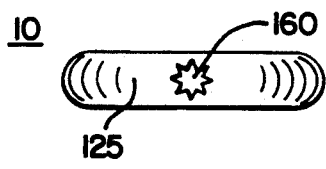
FIG. 18 is a top view of one of the fastening devices having a Torx head as one of the alternative embodiments of the present invention.
Figure 19:
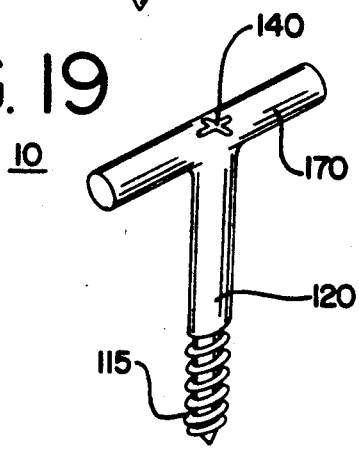
FIG. 19 is a perspective view of the T-shaped fastener having a multiple spline head as one of the alternative embodiments of the present invention.

Further, referring to FIGS. 10-19, the numeral 10 indicates generally the fastening device of alternative embodiments of the present invention. Fastening device 10 as shown in FIGS. 10, 11 and 12 have a threaded end 115 which is configured to be threaded into, upon rotation, a flat surface or member for securing shank portion 120 therewithin. Shank portion 120 may be configured to a ring or screw eye portion 125 in FIGS. 10 and 16; an open hook portion 130 in FIG. 11; a "L"-shaped or leg shaped portion 135 in FIG. 12; a "T"-shaped portion 170 in FIG. 19. Configured upon eye portion 125 in FIGS. 10, open hook portion 130 in FIG. 11; a "L"-shaped portion 135 in FIG. 12; a "T"-shaped portion 170 in FIG. 19 is a drive receiving means, or a torquing cavity means 140, which is configured as a Phillips head or multiple spline configuration 140. Drive receiving means or a torquing cavity means 140 may be a single spline, torx, square, hexagonal or polygonal configuration.

Referring to FIGS. 20-26, the numeral 10 indicates generally the fastening device of additional alternative embodiments of the present invention. Fastening device 10 as shown in FIGS. 20-26 has a threaded end 215 which is configured to be threaded into, upon rotation, a flat surface or member for securing shank portion 220 therewithin. Shank portion 220 may be configured to a closed square hook portion 225 in FIG. 20; an open square hook portion 230 in FIG. 21; a "C"-shaped portion 235 in FIGS. 22; an elongated rectangular hook portion 245 in FIG. 23; a "V"-shaped hook portion 250 in FIG. 24; a crank shaped hook portion 255 in FIG. 25; and a bent hook portion 260 in FIG. 26. Configured upon each hook variety 225-260 is a drive receiving means, or a torquing cavity means 240, which is configured as a Phillips head or multiple spline configuration 240. Drive receiving means or a torquing cavity means 240 may be a single spline, torx, square, hexagonal or polygonal configuration.

Referring to FIGS. 27-29, the numeral 10 indicates generally the fastening device of additional alternative embodiments of the present invention. Fastening device 10 as shown in FIGS. 27-29 has a threaded end 315 which is configured to be threaded into, upon rotation, a flat surface or member for securing shank portion 320 therewithin. Shank portion 320 may be configured to an open diamond hook portion 325 in FIG. 27; an eye or closed diamond hook portion 330 in FIG. 28; an eye or triangle hook portion 335 in FIG. 29. Configured upon each hook variety 325 through 335 is a drive receiving means, or a torquing cavity means 340, which is configured as a Phillips head or multiple spline configuration 340. Drive receiving means or a torquing cavity means 340 may be a single spline, torx, square, hexagonal or polygonal configuration.

A T-shaped fastener, open or closed square hook, C-shaped hook, elongated rectangular hook, V-shaped hook, crank shaped hook, bent hook, open diamond hook, closed diamond hook, and triangle hook generally comprise an integrated combination of members, some of which are horizontal, vertical and angled, each having two ends.

A conventional rotating drive means such as a screw driver or mechanically rotating bit is adapted to cooperatively rotate multiple spline configuration 40 thereby rotating eye portion 25 or open hook 30 or leg 35 respectively and thereby shank portion 20 and threaded end 15 for insertion into a member or flat surface.

Referring to FIGS. 10-19, a conventional rotating drive means such as a screw driver or mechanically rotating bit is adapted to cooperatively rotate the multiple spline configuration 140 thereby rotating eye portion 125, open hook 130, leg 135, or "T"-shaped portion 170 respectively and thereby shank portion 120 and threaded end 115 for insertion into a member or flat surface.

Referring to FIGS. 20-26, a conventional rotating drive means such as a screw driver or mechanically rotating bit is adapted to cooperatively rotate multiple spline configuration 240 thereby rotating open square hook 230, closed square hook 225, "C"-shaped hook 235, elongated rectangular hook 245, "V"-shaped hook 255, crank shaped hook, or bent hook to be driven respectively and thereby shank portion 220 and threaded end 215 for insertion into a member or flat surface.

Referring to FIGS. 27-29, a conventional rotating drive means such as a screw driver or mechanically rotating bit is adapted to cooperatively rotate the multiple spline configuration 340 thereby rotating open diamond hook portion 325, closed diamond hook portion 330, or triangle hook portion 335 respectively thereby shank portion 320 and threaded end 315 for insertion into a member or flat surface.

Figure 5:
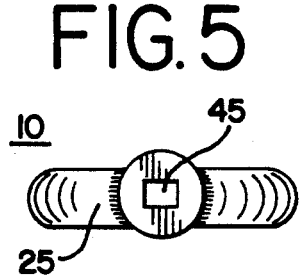
FIG. 5 is a top view of one of the fastening devices having a Robertson head as one of the embodiments of the present invention.
Figure 6:
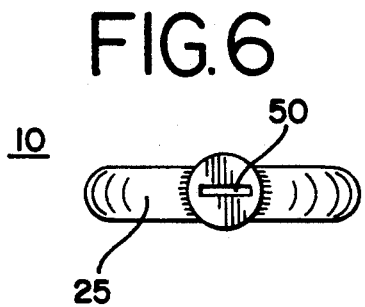
FIG. 6 is a top view of one of the fastening devices having a straight head as one of the embodiments of the present invention.
Figure 7:
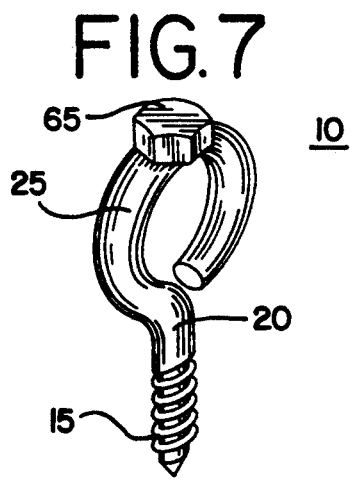
FIG. 7 is a perspective view of hex protrusion as one of the embodiments of the present invention.
Figure 8:
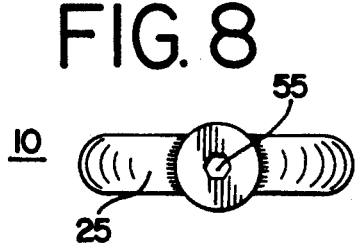
FIG. 8 is a top view of one of the fastening devices having a Allen or Hex head as one of the embodiments of the present invention.
Figure 9:
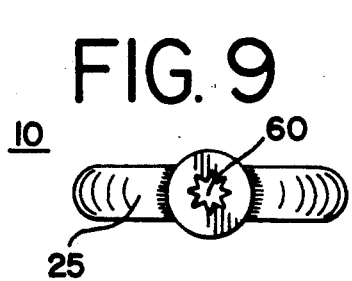
FIG. 9 is a top view of one of the fastening devices having a Torx head as one of the embodiments of the present invention.

FIG. 5 depicts a square configuration torquing cavity 45 configured on portion 25. In FIG. 6 a single spline slot configuration torquing cavity 50 is configured on portion 25. In FIG. 8, a hex configuration torquing cavity 55 is configured on portion 25. In FIG. 9, a torx configuration torquing cavity 60 is configured on portion 25. In FIG. 7, a hex configuration torquing protrusion 65 is configured on portion 25.

Figure 14:
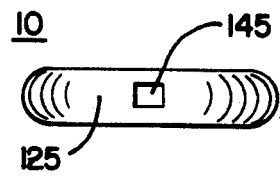
FIG. 14 is a top view of one of the fastening devices having a Robertson head as one of the alternative embodiments of the present invention.
Figure 15:
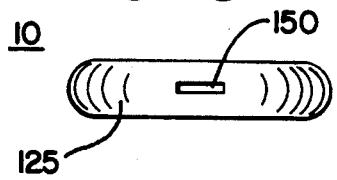
FIG. 15 is a top view of one of the fastening devices having a single spline head as one of the alternative embodiments of the present invention.
Figure 16:
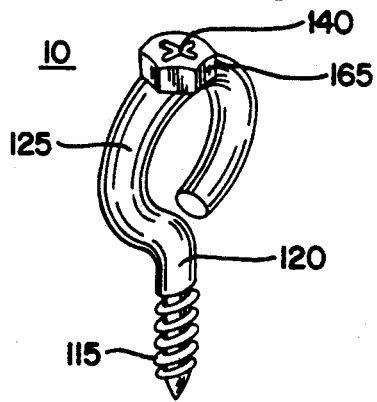
FIG. 16 is a perspective view of hex protrusion having a multiple spline cavity as one of the alternative embodiments of the present invention.

FIG. 14 depicts a square configuration torquing cavity 145 configured on portion 125. In FIG. 15 a single spline slot configuration torquing cavity 150 is configured on portion 125. In FIG. 17, a hex configuration torquing cavity 155 is configured on portion 125. In FIG. 18, a torx configuration torquing cavity 160 is configured on portion 125. In FIG. 16, a hex configuration torquing protrusion 165 has a multiple spline cavity 140 and all of which are configured on portion 125. FIG. 19 depicts a multiple spline configuration torquing cavity 140 configured on portion 170.

FIG. 20 depicts a multiple spline cavity 240 configured on portion 225. FIG. 21 depicts a multiple spline cavity 240 configured on portion 230. FIG. 22 depicts a multiple spline cavity 240 configured on portion 235. FIG. 23 depicts a multiple spline cavity 240 configured on portion 245. FIG. 24 depicts a multiple spline cavity 240 configured on portion 250. FIG. 25 depicts a multiple spline cavity 240 configured on portion 255. FIG. 26 depicts a multiple spline cavity 240 configured on portion 260.

FIG. 27 depicts a multiple spline cavity 340 configured on portion 325. FIG. 28 depicts a multiple spline cavity 340 configured on portion 330. FIG. 29 depicts a multiple spline cavity 340 configured on portion 335.

In each of the various embodiments shown in the drawing figures and described above, a support device or fastener 10 is comprised of a threaded shank 20 connected to a support end having a conventional drive receiving means configured to the support end 25, 30, 35 of the shank opposite the threaded portion 15. The drive receiving means 40, 45, 50, 55, 60, 65 be it a torquing protrusion or cavity receives a conventional drive force element of a screwdriver, socket wrench, drive socket element, rachet or other mechanical means to drive the support device 10 into a member such as a wall, ceiling, floor or other surface. The present invention obviates the need for various cumbersome means of trying to rotate an open or closed hook or "L"-shaped fastener with a makeshift method of rotating the fastener. The adaption of the present invention driving means whether it be a torquing cavity or protrusion by a powered device or even by hand provides great speed and assistance in the mounting and removal of these fastening devices.

In each of the various alternative embodiments shown in the FIGS. 10-19, and described above, a support device or fastener 10 is comprised of a threaded shank 120 connected to a support end having a conventional drive receiving means configured to the support end 125, 130, 135 of the shank opposite the threaded portion 115. The drive receiving means 140, 145, 150, 155, 160, 165, be it a torquing protrusion or cavity, receives a conventional drive force element of a screwdriver, socket wrench, drive socket element, rachet or other mechanical means to drive the support device 10 into a member such as a wall, ceiling, floor or other surface. The alternative embodiments of the present invention obviates the need for various cumbersome means of trying to rotate an open or closed hook, "L"-shaped fastener, or a "T"-shaped fastener with a makeshift method of rotating the fastener.

Further, in each of the various alternative embodiments shown in the FIGS. 20-26, and described above, a support device or fastener 10 is comprised of a threaded shank 220 connected to a support end having a conventional drive receiving means configured to the support end 225, 230, 235, 245, 250, 255 and 260 of the shank opposite the threaded portion 215. The torquing cavity means 240 receives a conventional drive force element of a screwdriver, socket wrench, drive socket element, rachet or other mechanical means to drive the support device 10 into a member such as a wall, ceiling, floor or other surface. The additional alternative embodiments of the present invention obviates the need for various cumbersome means of trying to rotate an open or closed square hook, "C"-shaped hook, elongated rectangular hook, "V"-shaped hook, crank shaped hook, or bent hook with a makeshift method of rotating the fastener.

Further, in each of the various alternative embodiments shown in the FIGS. 27-29, and described above, a support device or fastener 10 is comprised of a threaded shank 320 connected to a support end having a conventional drive receiving means configured to the support end 325, 330, and 335 of the shank opposite the threaded portion 315. The torquing cavity means 340 receives a conventional drive force element of a screwdriver, socket wrench, drive socket element, rachet or other mechanical means to drive the support device 10 into a member such as a wall, ceiling, floor or other surface. The additional alternative embodiments of the present invention obviates the need for various cumbersome means of trying to rotate an open or closed square hook, "C"-shaped hook, elongated rectangular hook, "V"-shaped hook, cranked shaped hook, bent hook, open diamond hook, closed diamond hook, or triangle hook with a makeshift method of rotating the fastener.

The adaption of the present invention driving means whether it be a torquing cavity or protrusion by a powered device or even by hand provides great speed and assistance in the mounting and removal of these fastening devices. While the foregoing has presented certain specific embodiments of the present invention, it is to be understood that these embodiments have been presented by way of example only. For example it is intended and claimed that many combinations of cavity and/or protrusion configurations may be configured on various shaped conventional fasteners now known or in the future. It is expected that others will perceive differences which, while bearing from the foregoing do not depart from the spirit and scope of the invention herein described and claimed.

What is claimed is:

1. A support device, for supporting an associated device, comprising:
    a shank having first and second ends, said first end being threadably adaptable to be driven into a member for securing said shank therewithin;
    support means for supporting an associated device, said support means extending away from and integral with said second end of said shank, defining a juncture between said support means and said shank; and
    a torquing cavity on said support means and spaced away from said juncture and aligned with the longitudinal axis of said shank.

2. A support device, comprising:
    a shank having first and second ends, said first end being threadably adaptable to be driven into a member for securing said shank therewithin;
    support means for supporting an associated device, said support means extending away from and integral with said second end of said shank, defining a juncture between said support means and said shank;
    a torquing protrusion on said support means and spaced away from said juncture and aligned with the longitudinal axis of said shank; and
    said torquing protrusion having at least one torquing cavity.

3. The support device recited in claim 1 or 2, wherein said torquing cavity is a single spline slot.

4. The support device recited in claim 1 or 2, wherein said torquing cavity is multiple spline slots.

5. The support device recited in claim 1 or 2, wherein said torquing cavity is hexagonal.

6. The support device recited in claim 1 or 2, wherein said torquing cavity is square.

7. The support device recited in claim 1 or 2, wherein said torquing cavity has a Torx configuration.

8. The support device recited in claim 1 or 2, wherein said torquing cavity is a polygon.

9. A support device, comprising:
    a shank having first and second ends, said first end being threadably adaptable to be driven into a member for securing said shank therewithin;
    support means for supporting an associated device, said support means extending away from and integral with said second end of said shank, defining a juncture between said support means and said shank;
    a torquing protrusion on said support means and spaced away from said juncture and aligned with the longitudinal axis of said shank.

10. The support device recited in claim 9, wherein said torquing protrusion is hexagonal.

* * * * *